United States Patent
Tsukano

(10) Patent No.: US 9,871,951 B2
(45) Date of Patent: Jan. 16, 2018

(54) APPARATUS AND COMPUTER PROGRAM PRODUCT CONTROLLING PRINTER COLOR CALIBRATION USING COLOR CHART HISTORY INFORMATION

(71) Applicant: Konica Minolta, Inc., Chiyoda-ku, Tokyo (JP)

(72) Inventor: Toshiki Tsukano, Hachioji (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/812,645

(22) Filed: Jul. 29, 2015

(65) Prior Publication Data
US 2016/0044209 A1 Feb. 11, 2016

(30) Foreign Application Priority Data
Aug. 6, 2014 (JP) ................................ 2014-160005

(51) Int. Cl.
*H04N 1/60* (2006.01)
*H04N 1/00* (2006.01)
(Continued)

(52) U.S. Cl.
CPC ............. *H04N 1/60* (2013.01); *G06K 15/027* (2013.01); *G06K 15/1878* (2013.01);
(Continued)

(58) Field of Classification Search
None
See application file for complete search history.

(56) References Cited

U.S. PATENT DOCUMENTS 6,048,117 A * 4/2000 Banton ............... H04N 1/00002
400/120.09
6,721,068 B2 * 4/2004 Weiss .................. H04N 1/6033
358/518
(Continued)

FOREIGN PATENT DOCUMENTS

JP 2001-320592 A 11/2001
JP 2005-219331 A 8/2005
(Continued)

OTHER PUBLICATIONS

Office Action (Notification of Reasons for Refusal) dated Oct. 28, 2016 issued by the Japanese Patent Office in corresponding Japanese Patent Application No. 2014-160005, and English language translation of Office Action (12 pages).

*Primary Examiner* — Scott A Rogers
(74) *Attorney, Agent, or Firm* — Buchanan Ingersoll & Rooney

(57) ABSTRACT

Provided are a print control apparatus and a non-transitory computer-readable storage medium storing a color calibration control program. A print control apparatus includes an information storage processing section which stores measured color values into a database which stores history information of color measurement, where the measured color values are obtained by measuring colors in a color chart by using a printing device. The print control apparatus further includes a color defining section which defines a specific color by referring to the database, and a color calibration controlling section which, while the printing device is processing a print job, causes the printing device to measure the specific color, determines whether to calibrate the printing device on the basis of a change with time in the measured color value of the specific color, and calibrates the printing device according to the determination result.

27 Claims, 14 Drawing Sheets

(51) Int. Cl.
  *G06K 15/02* (2006.01)
  *H04N 1/40* (2006.01)
(52) U.S. Cl.
  CPC ....... *H04N 1/0005* (2013.01); *H04N 1/00015* (2013.01); *H04N 1/00023* (2013.01); *H04N 1/00034* (2013.01); *H04N 1/00045* (2013.01); *H04N 1/00055* (2013.01); *H04N 1/00063* (2013.01); *H04N 1/00068* (2013.01); *H04N 1/00087* (2013.01); *H04N 1/40006* (2013.01); *H04N 1/603* (2013.01); *H04N 1/6033* (2013.01); *H04N 2201/0094* (2013.01)

(56) References Cited

U.S. PATENT DOCUMENTS

| | | | | |
|---|---|---|---|---|
| 7,403,305 | B2* | 7/2008 | Nakajima | H04N 1/6033 358/518 |
| 7,782,482 | B2* | 8/2010 | Tanaka | H04N 1/6033 358/518 |
| 8,072,646 | B2* | 12/2011 | Mestha | H04N 1/6058 358/1.9 |
| 2004/0114165 | A1* | 6/2004 | Nakajima | H04N 1/6033 358/1.9 |
| 2007/0258102 | A1* | 11/2007 | Bielak | H04N 1/6055 358/1.9 |
| 2012/0250044 | A1* | 10/2012 | Teraue | H04N 1/6033 358/1.9 |
| 2012/0327435 | A1* | 12/2012 | Ishii | H04N 1/6033 358/1.9 |
| 2013/0011153 | A1 | 1/2013 | Toriyabe | |
| 2015/0220819 | A1* | 8/2015 | Yamamoto | G06K 15/027 358/1.9 |

FOREIGN PATENT DOCUMENTS

| | | |
|---|---|---|
| JP | 2006-201613 A | 8/2006 |
| JP | 2006-270391 A | 10/2006 |
| JP | 2010-201819 A | 9/2010 |
| JP | 2012-217054 A | 11/2012 |
| JP | 2013-21467 A | 1/2013 |

* cited by examiner

FIG. 9A

PRINTER 1

| COLOR NO. | REFERENCE VALUE (RGB) | MEASURED COLOR VALUE 1 (RGB) | MEASURED COLOR VALUE 2 (RGB) | MEASURED COLOR VALUE 3 (RGB) | MEASURED COLOR VALUE 4 (RGB) | ... |
|---|---|---|---|---|---|---|
| 1 | (10,0,0) | (11,0,0) | (13,0,0) | (13,0,0) | (15,0,0) | ... |
| 2 | (20,0,0) | (21,0,0) | (21,0,0) | (21,0,0) | (22,0,0) | ... |
| ... | ... | ... | ... | ... | ... | ... |

PRINTER 2

| COLOR NO. | REFERENCE VALUE (RGB) | MEASURED COLOR VALUE 1 (RGB) | MEASURED COLOR VALUE 2 (RGB) | MEASURED COLOR VALUE 3 (RGB) | MEASURED COLOR VALUE 4 (RGB) | ... |
|---|---|---|---|---|---|---|
| 1 | ... | ... | ... | ... | ... | ... |

FIG. 9B

PRINTER 1

| COLOR NO. | REFERENCE VALUE (RGB) | MEASURED COLOR VALUE 1 (RGB) | DETERMINATION RESULT 1 | MEASURED COLOR VALUE 2 (RGB) | DETERMINATION RESULT 2 |
|---|---|---|---|---|---|
| 1 | (10,0,0) | (11,0,0) | OK | (13,0,0) | NG |
| 2 | (20,0,0) | (21,0,0) | OK | (21,0,0) | OK |
| ... | ... | ... | ... | ... | ... |

PRINTER 2

| COLOR NO. | REFERENCE VALUE (RGB) | MEASURED COLOR VALUE 1 (RGB) | DETERMINATION RESULT 1 | MEASURED COLOR VALUE 2 (RGB) | DETERMINATION RESULT 2 |
|---|---|---|---|---|---|
| 1 | ... | ... | ... | ... | ... |

APPARATUS AND COMPUTER PROGRAM PRODUCT CONTROLLING PRINTER COLOR CALIBRATION USING COLOR CHART HISTORY INFORMATION

This application is based on Japanese Patent Application No. 2014-160005 filed on Aug. 6, 2014, in the Japan Patent Office, the entire content of which is hereby incorporated by reference.

TECHNICAL FIELD

The present invention relates to a print control apparatus and a non-transitory computer-readable storage medium storing a color calibration control program. In particular, the present invention relates to a print control apparatus for controlling at least one printing device and a non-transitory computer-readable storage medium storing a color calibration control program to be executed in the print control apparatus.

BACKGROUND

Printing devices such as a copier and an MFP (Multi-function Peripheral) having a color printing function are now widespread. To perform color printing using such a printing device, there is a need to calibrate the printing device so as to accurately reproduce colors contained in pages of a print job (also referred to as color calibration). A method of such a color calibration includes a step of forming an image of a color chart in which color patches are arrayed on a sheet of paper; a step of measuring colors of the color patches formed on the sheet with an inline sensor provided in the printing device; a step of obtaining an amount of change in colors in the color chart by comparing the measured color values given by the inline sensor with the corresponding reference values (a target color value set for each patch); and performing feedback continually so that the amount of change in colors falls within an appropriate range.

As an example relating to such a color calibration, Japanese Unexamined Patent Publication (JP-A) No. 2010-201819 discloses a printing device including: a conveyance unit for conveying a printing medium in a predetermined conveying direction; a printing unit that can print an image onto the printing medium during the conveyance on the basis of printing data expressing the image; a color measuring unit for measuring colors in a region extending in the conveying direction on the printing medium; an analysis unit for analyzing a change in measured color values in the region obtained by the color measurement; and an adjustment processing unit for performing a predetermined adjustment processing about the printing unit and/or the color measuring unit according to the result of the analysis.

As another example, JP-A No. 2006-201613 discloses an image forming apparatus that adjusts an image forming condition by measuring the density of a pattern for image density measurement formed on a recording material by using an optical measuring unit. The image forming apparatus includes: a formation unit for forming a test pattern in a region designated on the recording material before adjusting the image forming condition using the pattern for image density measurement; a density difference obtaining unit for obtaining a density difference between the density of the test pattern measured by the optical measuring unit and a reference density corresponding to the test pattern; a density fluctuation determination unit for determining an existence of a density fluctuation on the basis of the density difference; and a determination unit for determining whether or not to adjust the image forming condition that uses the pattern for image density measurement, according to the determination result of the density fluctuation determination unit.

A conventional color calibration technique includes a step of printing a color chart periodically (once in a certain number of sheets or once in a certain period of time), a step of comparing measured color values of colors in the color chart with the corresponding reference values, and a step of performing color calibration if an amount of change in color exceeds a certain value. However, this method has a problem of wastes of consuming resources and time.

That is, in a conventional color calibration technique, when the prescribed number of output sheets or prescribed elapsed time is reached, a printing device prints out a color chart irrespective of a necessity of color calibration. It makes problems of increase in unusable print sheets (waste or spoiled sheets), increase in the amount of consumption of consumables, increase in waiting time for printing, or the like. Further, before the prescribed number of output sheets or prescribed elapsed time is reached, the printing device does not print out a color chart irrespective of a necessity of color calibration. Accordingly, when the printing device passed into a state that the printing device needs to be calibrated during that period, the printing device makes outputs with the color reproducibility insufficiently secured. It creates a certain number of waste or spoiled sheets and re-print processing wastes additional consumables and time, which are problems. The present invention seeks to solve the problems.

SUMMARY

There are disclosed illustrative print control apparatuses and non-transitory computer-readable storage media each storing a color calibration control program.

An illustrative print control apparatus reflecting one aspect of the present invention is a print control apparatus for controlling at least one printing device. The print control apparatus comprises an information storage processing section which stores measured color values into a database, where the measured color values are obtained by measuring colors in a color chart by using a printing device. The database stores history information of color measurement. The print control apparatus further comprises a color defining section which defines a specific color by referring to the database, where the specific color is a color to be used for determining whether to calibrate the printing device. The print control apparatus further comprises a color calibration controlling section which, while the printing device is processing a print job, causes the printing device to measure the specific color to obtain a measured color value of the specific color, determines whether to calibrate the printing device on a basis of a change with time in the measured color value of the specific color, and in response to determining to calibrate the printing device, calibrates the printing device.

An illustrative non-transitory computer-readable storage medium reflecting one aspect of the present invention stores a color calibration control program to be executed in a print control apparatus which controls at least one printing device. The color calibration control program, when being executed by a processor of the print control apparatus, causes the print control apparatus to perform the following processing. The processing comprises storing measured color values into a database, where the measured color values are obtained by measuring colors in a color chart by using a printing device. The database stores history information of color measurement. The processing further comprises defining a specific color by referring to the database, where the specific color is a color to be used for determining whether to calibrate the printing device. The processing further comprises determining whether to calibrate the printing device while the printing device is processing a print job, which includes causing the printing device to measure the specific color to obtain a measured color value of the specific color, and determining whether to calibrate the printing device on a basis of a change with time in the measured color value of the specific color.

Other features of illustrative embodiments will be described below.

BRIEF DESCRIPTION OF THE DRAWINGS

Embodiments will now be described, by way of example only, with reference to the accompanying drawings which are meant to be exemplary, not limiting, and wherein like elements numbered alike in several figures, in which.

Figure 10:
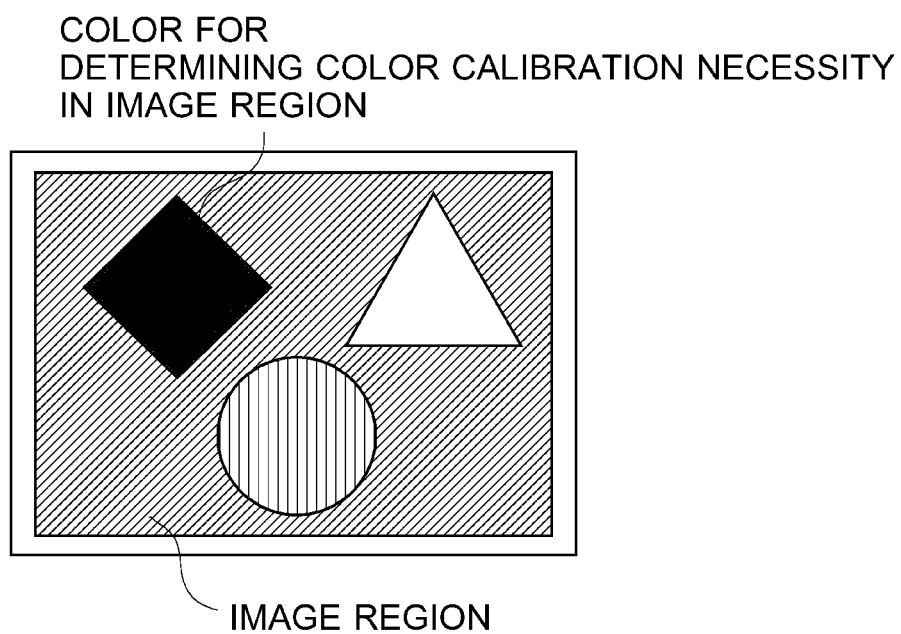
Figure 11A:
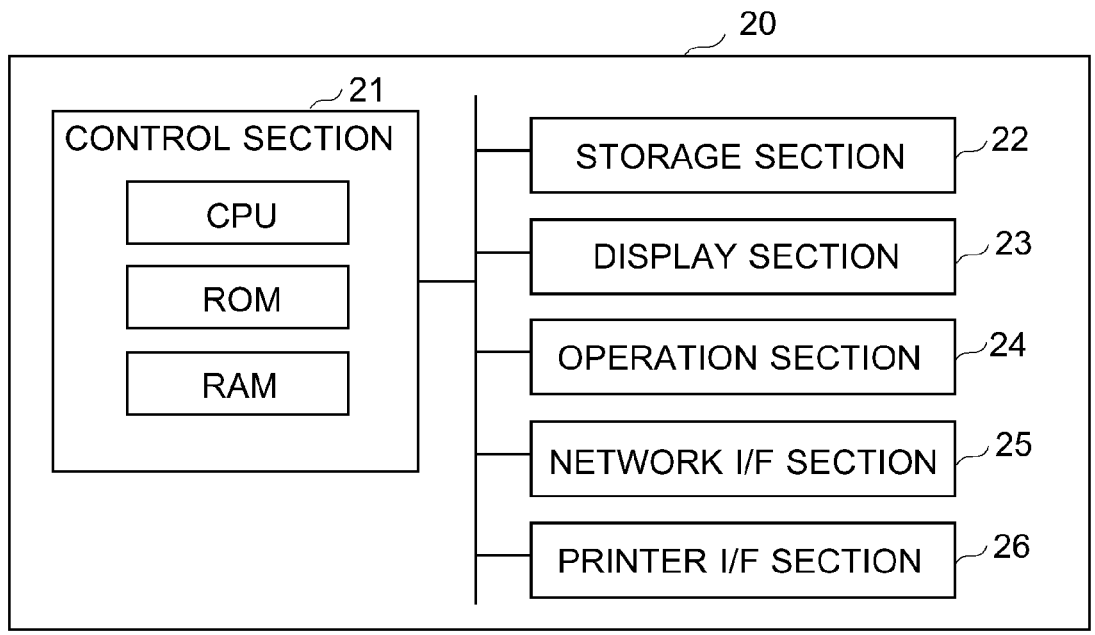
Figure 11B:
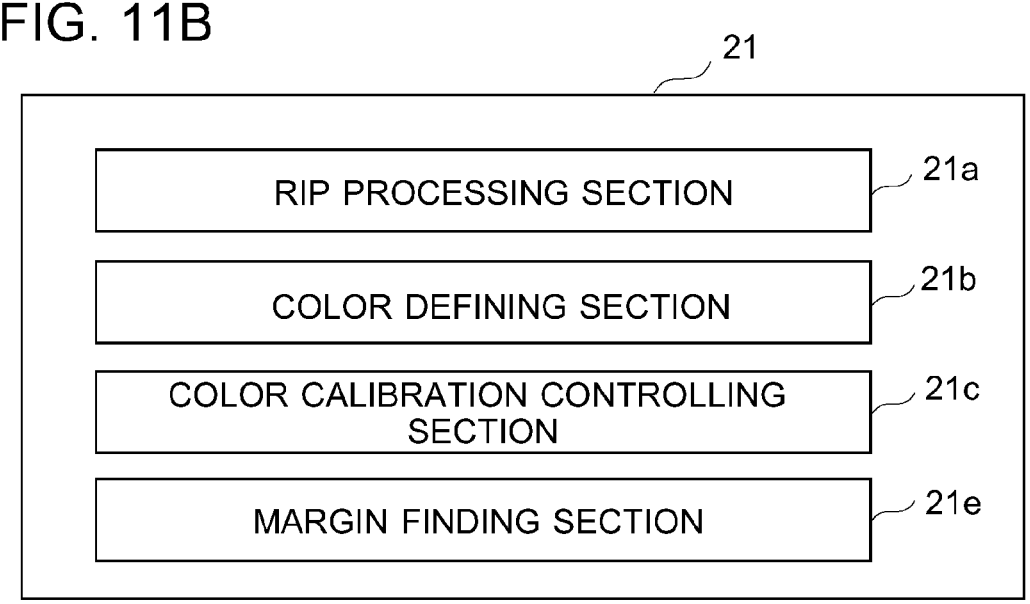
Figure 12:
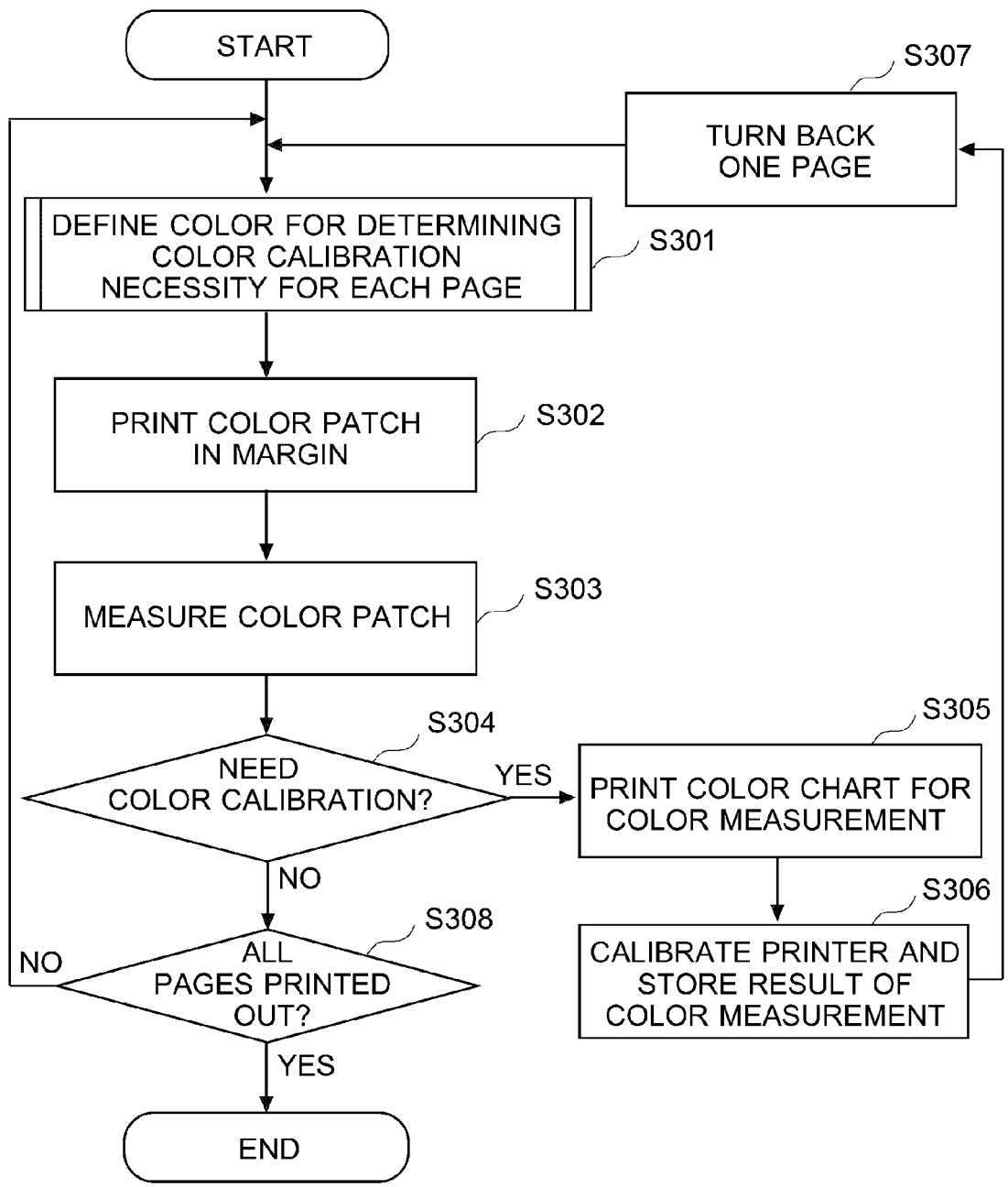
Figure 13:
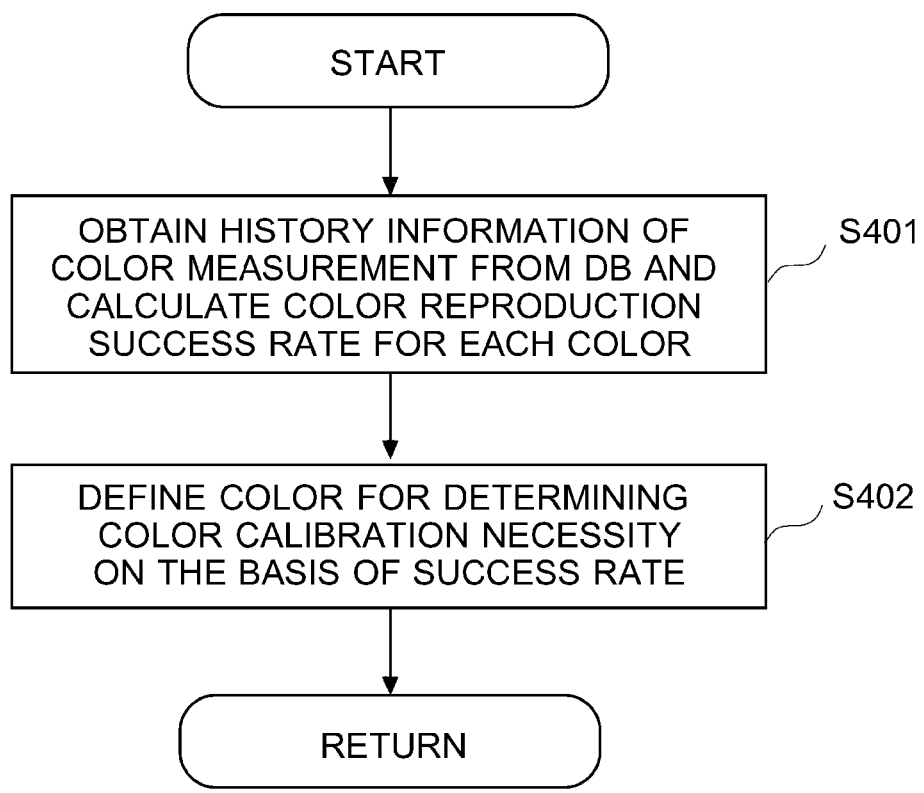
Figure 14:
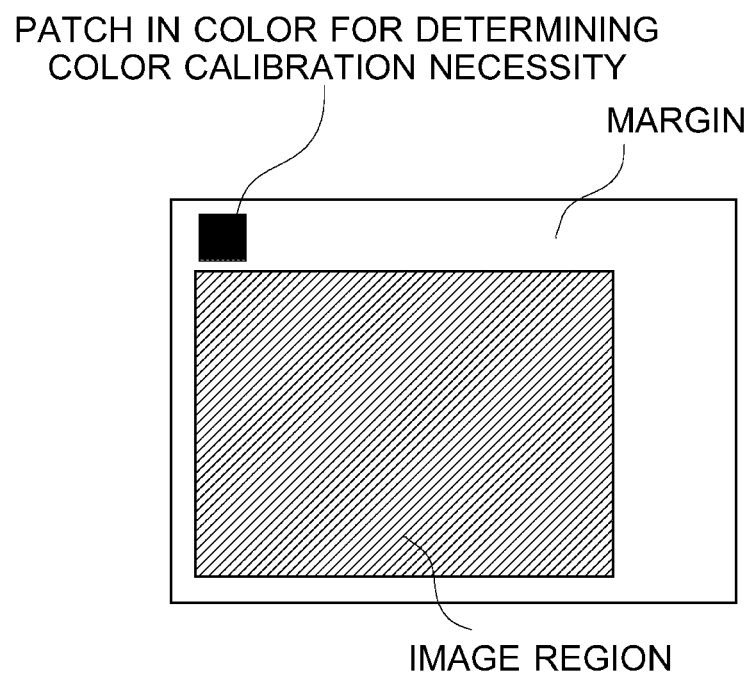

Each of FIGS. 9A and 9B illustrates an example of a database used in a process of defining a color for determining a color calibration necessity according to EXAMPLE 1;

FIG. 10 is a diagram illustrating a region in a color for determining a color calibration necessity according to EXAMPLE 1;

FIGS. 11A and 11B are block diagrams illustrating a structure of a printer controller according to EXAMPLE 2;

FIG. 12 is a flowchart illustrating operation of the printer controller according to EXAMPLE 2;

FIG. 13 is a flowchart illustrating operation (a process of defining a color for determining a color calibration necessity) of the printer controller according to EXAMPLE 2; and FIG. 14 is a diagram illustrating a patch in the color for determining a color calibration necessity according to EXAMPLE 2.

DETAILED DESCRIPTION

Illustrative embodiments of print control apparatuses and non-transitory computer-readable storage media each storing a color calibration control program will be described with reference to the drawings. It will be appreciated by those of ordinary skill in the art that the description given herein with respect to those figures is for exemplary purposes only and is not intended in any way to limit the scope of potential embodiments may be resolved by referring to the appended claims.

According to the illustrative print control apparatuses and non-transitory computer-readable storage media, color calibration of a printing device can be carried out on suitable timing, and wastes of resources and time can be reduced efficiently.

This is because the print control apparatus (printer controller) has a structure to perform the following operation. The print control apparatus defines a specific color to be used for determining whether to calibrate a printing device, by referring to a database which stores history information of color measurement of a color chart, where the color measurement was conducted by a printing device. While the printing device is processing a print job, the print control apparatus causes the printing device to measure the specific color, so as to monitor a change with time in the measured color value of the specific color, and thereby, determines whether to calibrate the printing device (in other words, determines a necessity of color calibration of the printing device).

As described in BACKGROUND, a conventional printing device is calibrated by: measuring colors in a color chart including an array of color patches with an inline sensor provided in the printing device; obtaining an amount of change in colors in the color chart by comparing the measured color values given by the inline sensor with the corresponding reference values; and carrying out feedback such that the amount of change in colors falls within an appropriate range. In such a conventional color calibration method, a printing device periodically prints out a color chart. Therefore, a color chart is printed out even if color calibration is not necessary for the printing device, which results in increases in waste or spoiled sheets, the amount of consumption of consumables, and waiting time for printing. Further, even if the printing device needs to be calibrated, the printing device is not calibrated unless the certain number of sheets of paper outputted or certain elapsed time has been reached. In such a printing device, printing processing is performed under the condition that the sufficient color reproducibility is not secured, and it makes a certain amount of waste or spoiled papers. That is, a technique to cause a printing device to periodically print out a color chart hardly prevents wastes of sheets of paper, consumables, and time.

In view of that, in one embodiment of the present invention, a database which stores history information of color measurement is formed in a server (a cloud server) or a storage, and measured color values, which are obtained by measuring colors in a color chart by using a printing device, are stored in the database in advance. A print control apparatus refers to the database to define a specific color to be used for determining whether to calibrate the printing device (hereinafter, also referred to as a color for determining a color calibration necessity), where one example of the specific color can be a color the reproducibility of which is difficult to be ensured in the printing device. While the printing device is processing a print job, the print control apparatus continually causes the printing device to measure the color for determining a color calibration necessity to check a change with time in this color, and thereby determines whether to calibrate the printing device. On the basis of the determination result, the print control apparatus calibrates the printing device.

Such color calibration control prevents a printing device from printing out a color chart under the condition that the printing device does not need color calibration and from executing print processing without color calibration under the condition that the printing device needs color calibration. Accordingly, it is possible to reduce wastes or spoiled sheets, consumables, and waiting time for printing. Further, such control can define a color for determining a color calibration necessity for each printing device, each user, or each page, separately, which can realize effective color calibration.

EXAMPLES

Example 1

Figure 1:
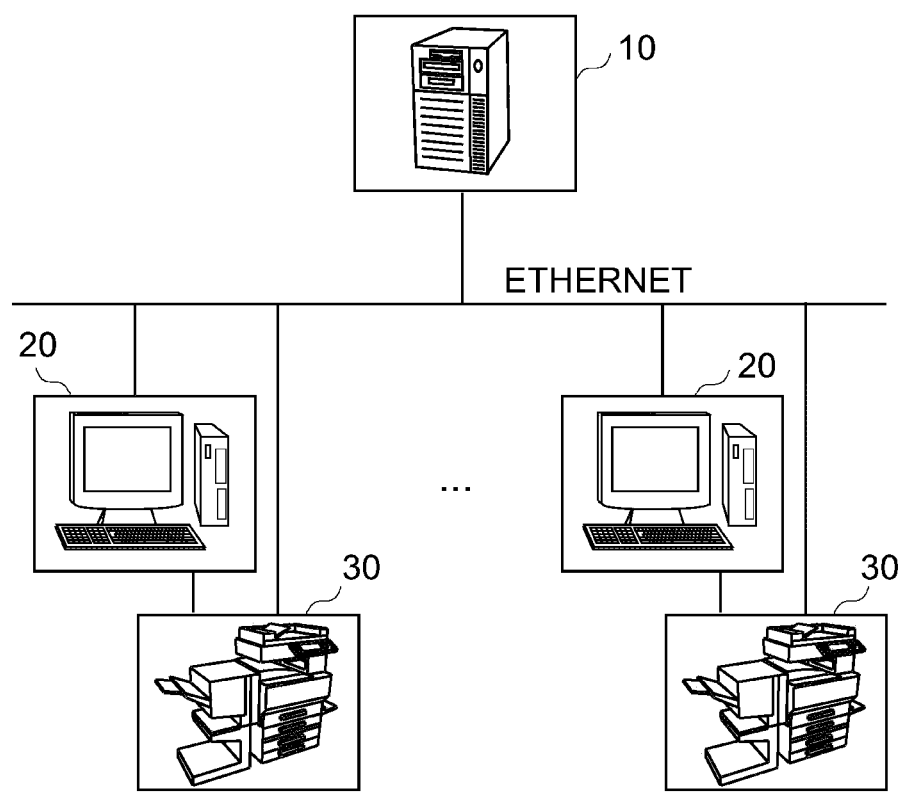
FIG. 1 is a diagram schematically illustrating a structure of a print system according to EXAMPLE 1.
Figure 3A:
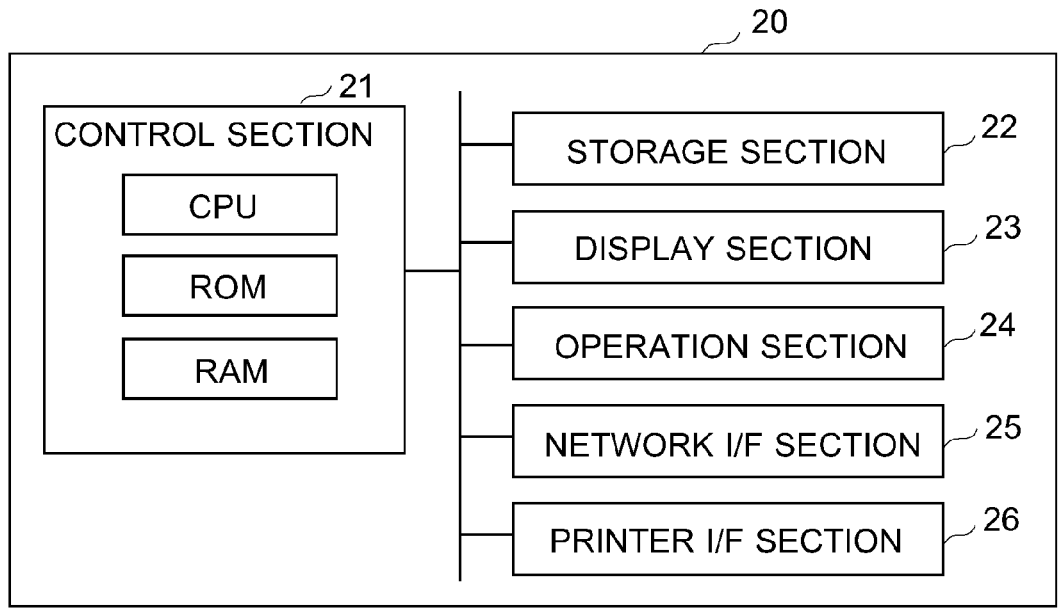
FIGS. 3A and 3B are block diagrams illustrating a structure of a printer controller according to EXAMPLE 1.
Figure 3B:
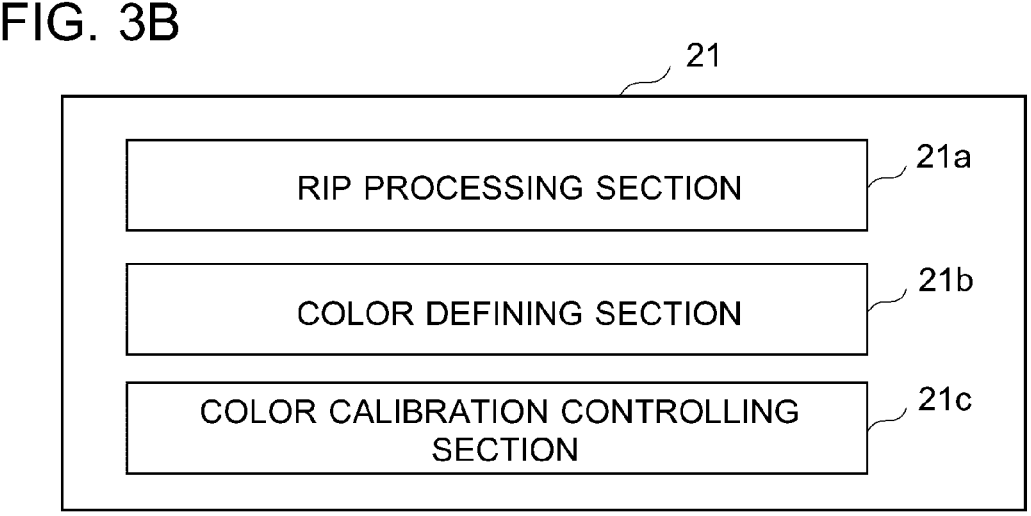
Figure 4:
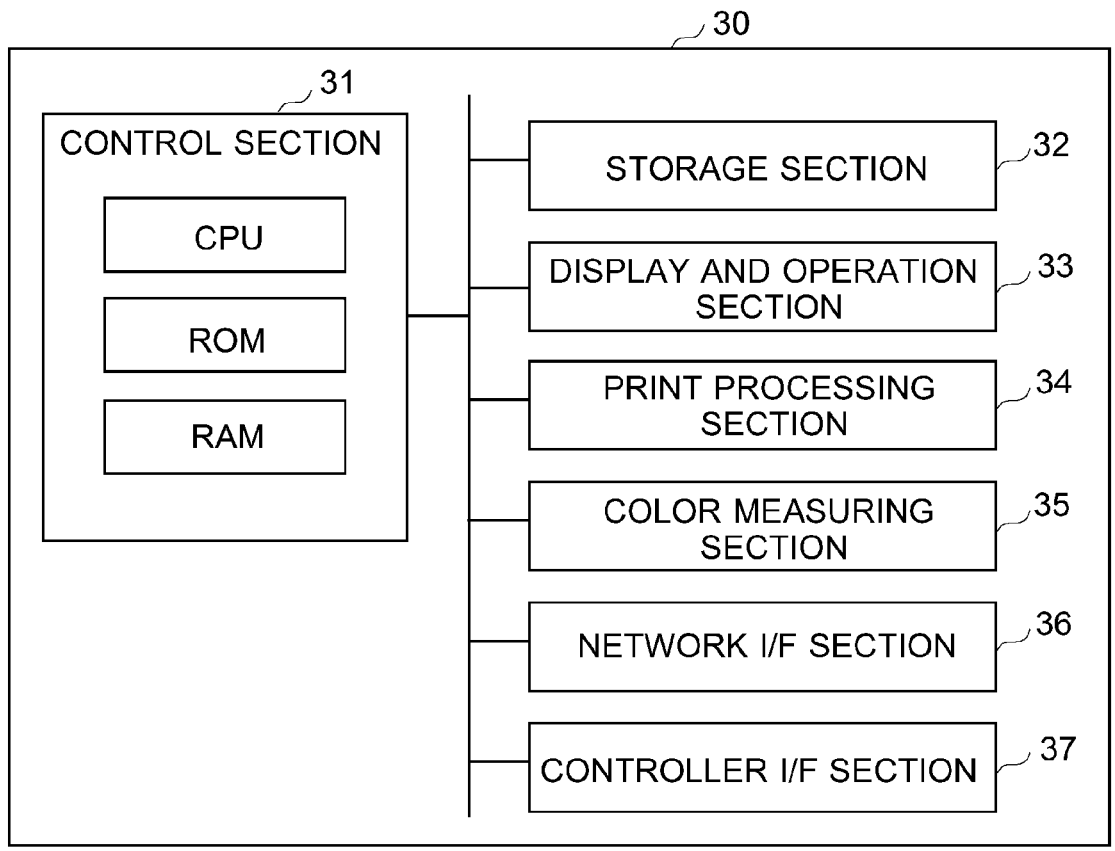
FIG. 4 is a block diagram illustrating a structure of a printer according to EXAMPLE 1.
Figure 5:
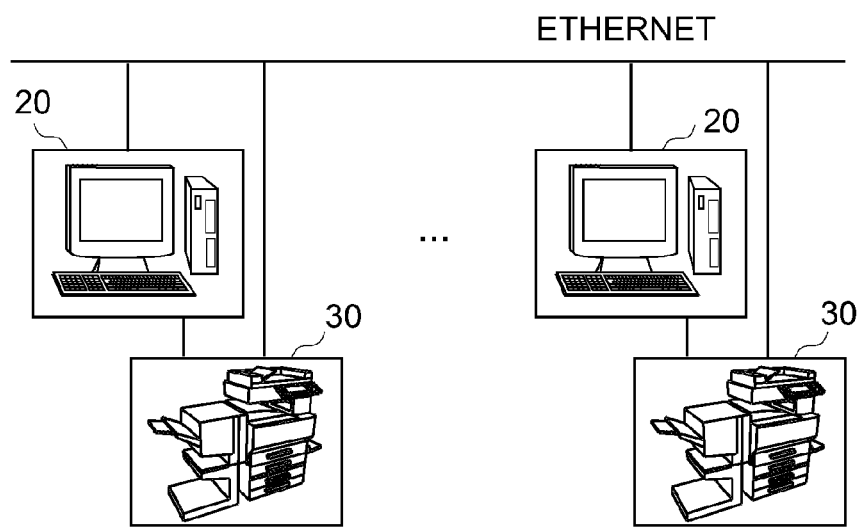
FIG. 5 is a diagram schematically illustrating another structure of a print system according to EXAMPLE 1.
Figure 6A:
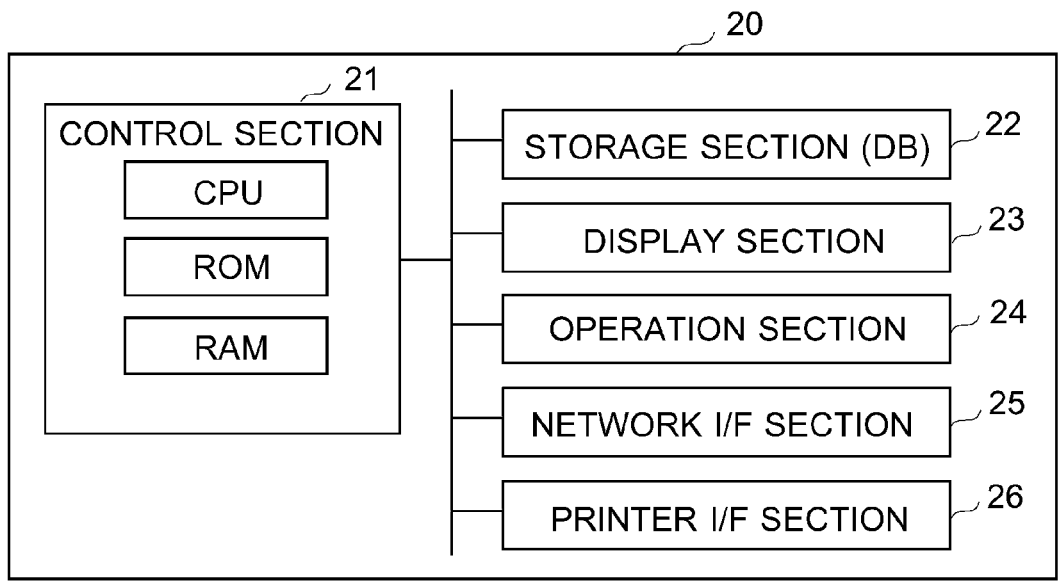
FIGS. 6A and 6B are block diagrams illustrating another structure of a printer controller according to EXAMPLE 1.
Figure 6B:
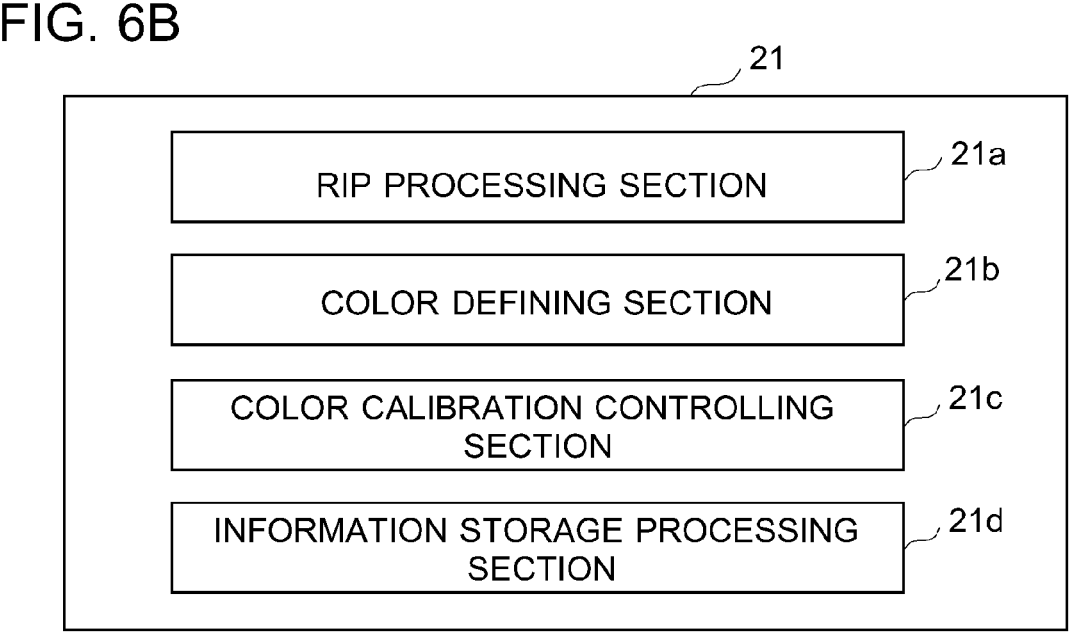
Figure 7:
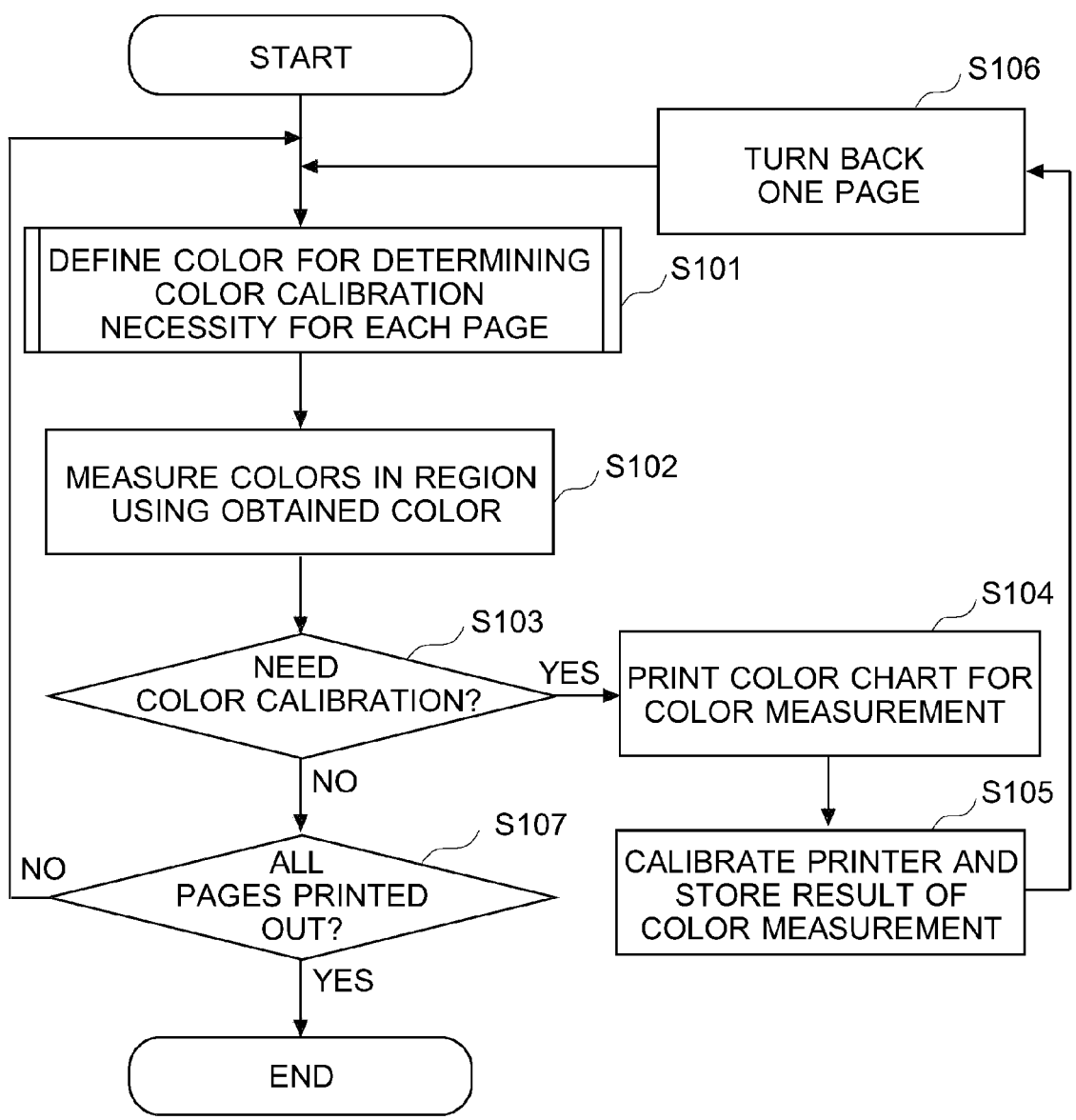
FIG. 7 is a flowchart illustrating operation of the printer controller according to EXAMPLE 1.
Figure 8:
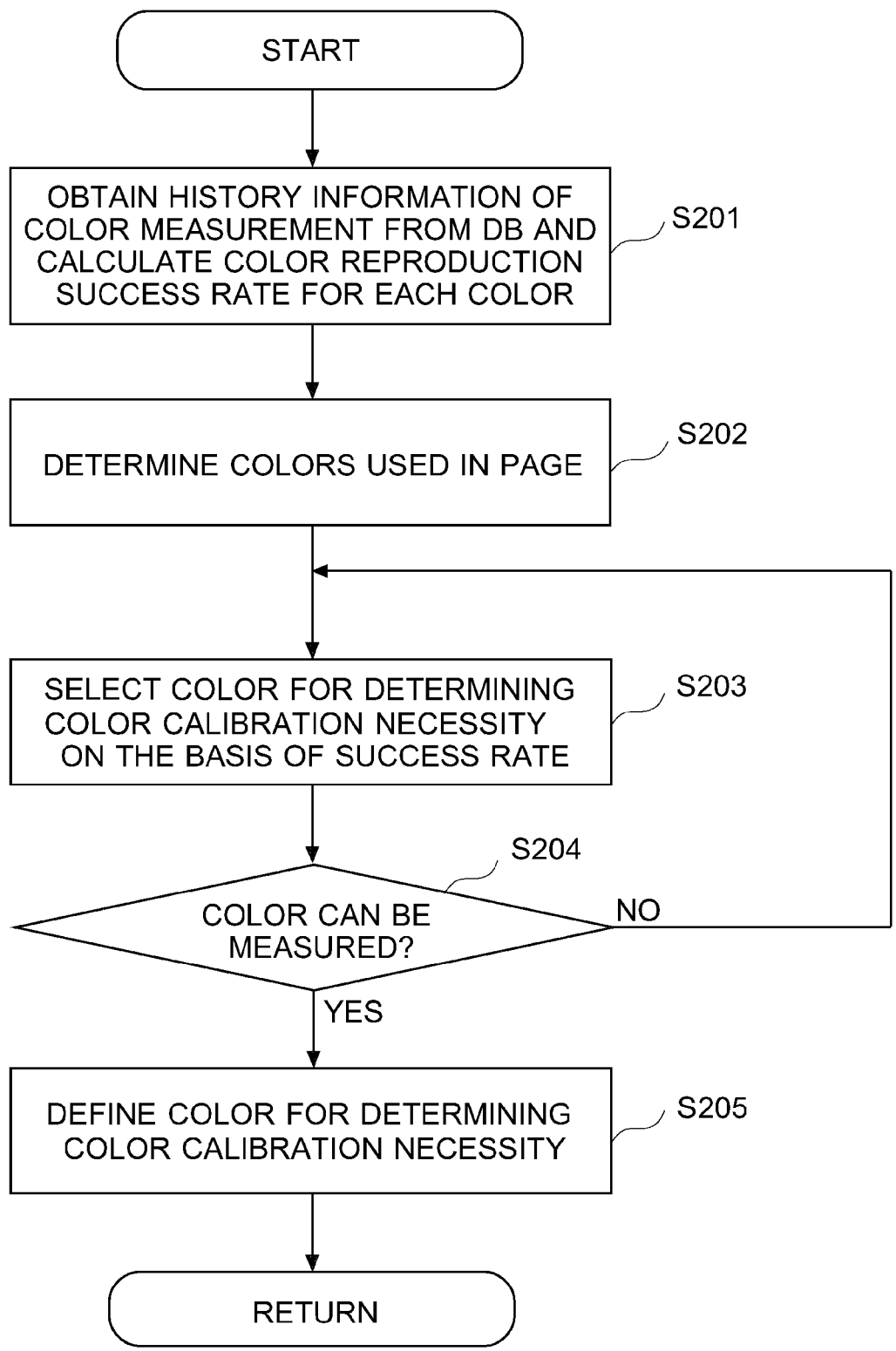
FIG. 8 is a flowchart illustrating operation (a process of defining a color for determining a color calibration necessity) of the printer controller according to EXAMPLE 1.

An illustrative print control apparatus, print system, non-transitory computer-readable storage medium storing a color calibration control program, and color calibration control method according to EXAMPLE 1 will be described with reference to FIGS. 1 to 10 so as to describe the above-described embodiment in detail. Each of FIGS. 1 and 5 is a schematic diagram illustrating a structure of a print system of the present example. FIGS. 2A to 4, 6A and 6B are block diagrams illustrating structures of devices in the print system. FIGS. 7 and 8 are flowcharts illustrating operation of a print control apparatus of the present example. Each of FIGS. 9A and 9B illustrates an example of a database to be referred to upon a process of defining a color for determining a color calibration necessity. FIG. 10 is a diagram illustrating a region in the color for determining a color calibration necessity.

As illustrated in FIG. 1, a print system of the present example has a structure such that server 10, print control apparatuses (printer controllers 20), and printing devices (printers 30), which can be connected together through a network, are arranged on an intranet. Though these devices in the figure are connected through Ethernet, printer controller 20 can transfer image data to printer 30 via a dedicated interface (IEEE 1394, parallel) instead of Ethernet. Printer controller 20 may be prepared separately from printer 30 as illustrated in FIG. 1 or may be included in printer 30. Hereafter, the structure of each device in the print system will be described in detail.

Figure 2A:
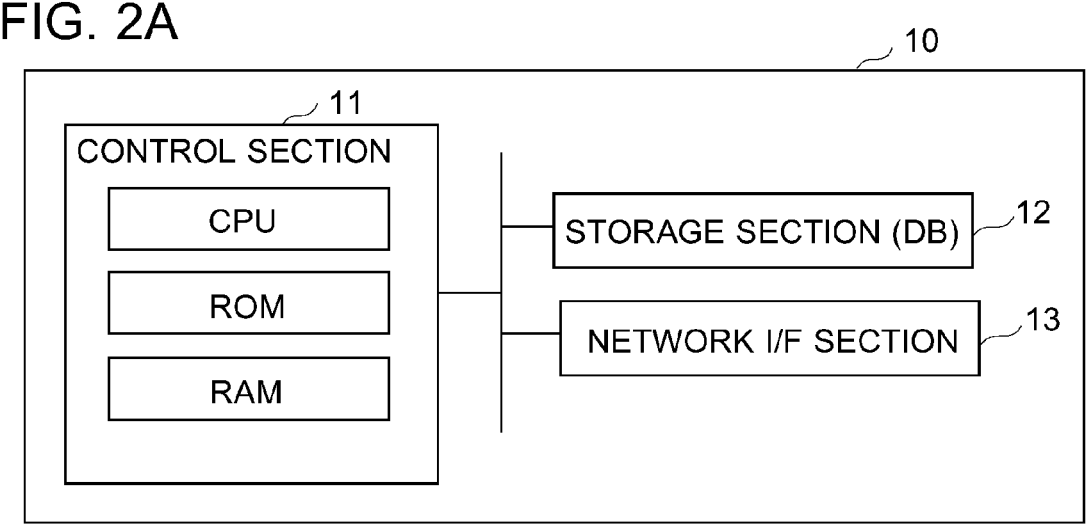
FIGS. 2A and 2B are block diagrams illustrating a structure of a server according to EXAMPLE 1.

Server:

As illustrated in FIG. 2A, server 10 includes control section 11, storage section 12, and network interface (I/F) section 13.

Figure 2B:
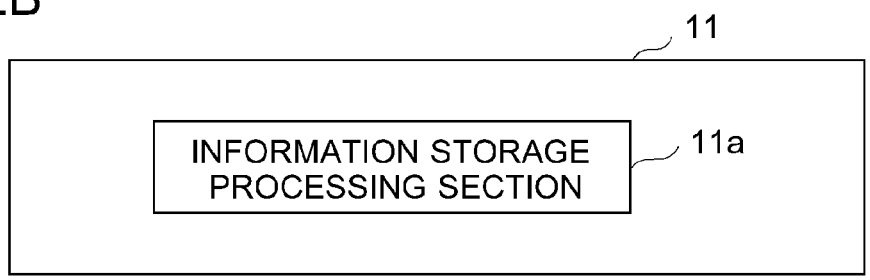

Control section 11 includes a CPU (Central Processing Unit) and a memory, such as ROM (Read Only Memory) and RAM (Random Access Memory). The CPU controls operation of the entire server 10 by loading control programs stored in the ROM or the storage section 12 into the RAM and executing the control programs. The control section 11 also serves as information storage processing section 11a as illustrated in FIG. 2B.

Information storage processing section 11a obtains data of measured color values from each printer 30 connected to the network, to create a database, and then stores the created database in storage section 12, where the measured color data is measured color values obtained by causing each printer 30 to measure colors in a color chart to be used for color calibration. The database is prepared for storing history information of color measurement and stores measured color values of each color in the color chart and the corresponding reference values (target color values set for the corresponding colors) such that the measured color values of each color can be compared with the corresponding reference value. If needed, the information storage processing section 11a may compare the measured color value of each color and the corresponding reference value, calculate a success rate of color reproduction for each color and/or a variation of color reproduction (measured color value) for each color, and then store the calculated success rate and/or variation into the database together with the measured color values and the corresponding reference value of each color. Herein, the success rate of color reproduction means a probability that a difference of the measured color value and the corresponding reference value falls in a predetermined range, in other words, a rate at which a color measurement such that a difference of the measured color value and the corresponding reference value fell in a predetermined range occurred.

Storage section 12 includes, for example, a HDD (Hard Disk Drive). The database created by information storage processing section 11a is stored in storage section 12. Network interface section 13 includes a device, such as an NIC (Network Interface Card) and a modem, and performs data communication with printer controllers 20 and printers 30 which are connected to the network.

Printer Controller:

Printer controller 20 is, for example, a computing device. As illustrated in FIG. 3A, printer controller 20 includes control section 21, storage section 22, display section 23, operation section 24, network interface (I/F) section 25, and printer interface (I/F) section 26.

Control section 21 includes a CPU and a memory, such as a ROM and a RAM. The CPU controls operation of the entire printer controller 20 by loading control programs stored in the ROM or the storage section 22 into the RAM and executing the control programs. Control section 21 also serves as RIP (Raster Image Processor) processing section 21a, color defining section 21b, and color calibration controlling section 21c, as illustrated in FIG. 3B.

RIP processing section 21a analyzes print data described in a PDL (Page Description Language) such as PostScript and PCL (Printer Control Language), rasterizes each page in the print data to generate bitmap image data of each page, and determines colors of various parts of a page image for each page. Then, RIP processing section 21a outputs the bitmap image data of each page to printer 30 so as to cause the printer 30 to print the page images based on the bitmap image data, onto sheets of paper.

Color defining section 21b defines a specific color which is a color to be used for determining whether to calibrate a printer (color for determining a color calibration necessity), as follows. Color defining section 21b obtains history information of color measurement by referring to the database stored in server 10, and calculates a rate at which a certain color measurement occurred for the each color in the color chart (a success rate of color reproduction of each color which will be described later) and/or a variation of a measured color value of each color in the color chart, where the predetermined color measurement is a color measurement such that a difference of a measured color value of each color and a corresponding reference value fell in a predetermined range. In place of the calculation, color defining section 21b may obtain the success rate of color reproduction for each color and/or the variation of measurement color values for each color, from the database. By using the rate and/or the variation for each color, color defining section 21b defines a specific color as the color to be used for determining appropriate execution timing of color calibration (a color for determining a color calibration necessity), where the specific color is a color, for example, the success rate of color reproduction of which is lower than those of the other colors and/or the variation of which is greater than those of the other colors, selected from among colors used in an image region of each page obtained from a print job.

While printer 30 is processing a print job, color calibration controlling section 21c causes the color measuring section 35 of the printer 30 to measure the specific color (color for determining a color calibration necessity) defined by color defining section 21b, to obtain the measured color value of the specific color, and determines whether to calibrate the printer 30 on the basis of a change with time in the measured color value of the specific color. For example, color calibration controlling section 21c may compare the measured color value of the specific color and the corresponding reference color obtained in the database stored in server 10, and then determine to calibrate the printer 30 when the difference of the measured color value and the reference value exceeds a predetermined threshold. Alternatively, color calibration controlling section 21c may determine whether to calibrate the printer 30 on the basis of history information of color measurement obtained from the database stored in server 10. On determining to calibrate the printer 30, color calibration controlling section 21c causes print processing section 34 of the printer 30 to print out a color chart including an array of patches in various colors, and causes the color measuring section 35 to measure the colors in the color chart. On the basis of data of color measurement obtained from the color measuring section 35, color calibration controlling section 21c calibrates the printer 30 by forming a printer profile according to a known method.

The above-described RIP processing section 21a, color defining section 21b, and color calibration controlling section 21c may be provided as hardware devices. Alternatively, the RIP processing section 21a, color defining section 21b, and color calibration controlling section 21c may be provided by a color calibration control program which causes the control section 21 to function as these sections when being executed. That is, the control section 21 may be configured to serve as RIP processing section 21a, color defining section 21b, and color calibration controlling section 21c, when the CPU executes the color calibration control program.

Storage section 22 includes, for example, a HDD, for storing print jobs, bitmap image data, programs and others. Display section 23 can be a display device like a LCD (Liquid Crystal Display), for displaying, for example, a screen which allows a user to give print instructions to printer 30 thereon. Operation section 24 can be a device, such as a mouse and a keyboard, for allowing a user to perform various operations on the screen.

Network interface section 25 includes a device, such as a NIC and a modem, for carrying out data communication with server 10 connected to the network. Printer interface section 26 engages in, for example, transmission of bitmap image data and output instructions to printer 30 and reception of data of measured color values from printer 30.

Printer:

Printer 30 is a printing device for carrying out print processing in response to instructions given by printer controller 20. As illustrated in FIG. 4, printer 30 includes, for example, control section 31, storage section 32, display and operation section 33, print processing section 34, color measuring section 35, network interface (I/F) section 36, and controller interface (I/F) section 37.

Control section 31 includes a CPU and a memory, such as a ROM and a RAM. The CPU controls operation of the entire printer 30 by loading control programs stored in the ROM or the storage section 32 into the RAM and executing the control programs.

Storage section 32 includes, for example, an HDD, and stores bitmap image data obtained from printer controller 20 and programs. Display and operation section 33 is a device like a touch panel which includes a display section like a LCD and an operation section like a touch sensor arranged on the display section. Display and operation section 33 can display various information relating to printing and allows a user to perform operations relating to printing thereon.

Print processing section 34 forms an image on a sheet of paper according to an electrophotography process, using bitmap image data obtained from printer controller 20. In concrete terms, print processing section 34 includes a writing unit, a photoreceptor unit, an intermediate transfer belt, a secondary transfer roller, a fixing unit, and a conveyance unit. The writing unit exposes a photosensitive drum by irradiating the drum with a laser beam according to image data. The photoreceptor unit includes a photosensitive drum, a developing unit, an electrification unit, a photoreceptor cleaning unit, and a primary transfer roller. The photoreceptor unit forms a toner image on the drum for each color of CMYK. The intermediate transfer belt is rotated by rollers and functions as an intermediate transfer body which conveys the toner images formed in the photoreceptor unit toward a sheet of paper. The secondary transfer roller transfers the toner images formed on the intermediate transfer belt onto a sheet of paper. The fixing unit fixes the toner images transferred onto the sheet. The conveyance unit includes parts for conveying sheets of paper, such as a feed roller, a resist roller, a loop roller, an inversion roller and an ejection roller.

Color measuring section 35 is an inline sensor provided for measuring the color for determining a color calibration necessity in an image region while executing a print job, and for measuring colors in a color chart in which color patches are arrayed. This inline sensor includes, for example, three kinds of sensors for R, G and B colors put in a paper conveyance route between the fixing unit and the paper discharge tray of print processing section 34. The inline sensor transmits data of measured color values obtained with the sensors to printer controller 20.

Network interface section 36 includes a device, such as a NIC and a modem, and performs data communication with server 10 connected to the network. Controller interface section 37, for example, transmits data of measured color values to printer controller 20, and receives bitmap image data and print instructions from printer 30.

It should be noted that FIGS. 1 to 4 illustrate an example of the print system of the present example and the configuration thereof can be changed as appropriate. For example, FIGS. 1, 2A and 2B illustrate a configuration in which control section 11 (information storage processing section 11a) of server 10 obtains history information of color measurement from printer 30 to create and store a database. Alternatively, the database may be created and stored by printer controller 20. In this case, as illustrated in FIG. 5, server 10 can be omitted from the print system. In such a print system, control section 21 of printer controller 20 further serves as information storage processing section 21d as illustrated in FIG. 6B, and information storage processing section 21d obtains history information of color measurement from printer 30 to create a database and stores the database in storage section 22 or arbitrary storage device on the network.

Hereafter, processing of the print system (especially, printer controller 20) of the above configuration will be described now. The CPU of printer controller 20 executes processes in the steps shown in the flowcharts of FIGS. 7 and 8 by loading a color calibration control program stored in the ROM or the storage section 22 into the RAM and executing the program. It should be noted that control section 11 of server 10 (information storage processing section 11a) or control section 21 of printer controller 20 (information storage processing section 21d) creates a database on the basis of history information of color measurement obtained from printer 30, and stores the created database in storage section 12 or storage section 22 in advance to the following processing.

First, control section 21 of printer controller 20 (color defining section 21b) defines a specific color as a color for determining a color calibration necessity with respect to bitmap image data generated by RIP processing section 21a for each page (S101). FIG. 8 illustrates the details of this step. First, control section 21 (color defining section 21b) obtains history information of color measurement from the database stored in storage section 12 of server 10 (or storage section 22 of printer controller 20). On the basis of the obtained history information of color measurement, the control section 21 calculates the success rate of color reproduction for each color (S201).

In concrete terms, as illustrated in FIG. 9A, the database stores a reference value of each color patch in the color chart, and corresponding measured color values, where the reference value is a target color value set for each color patch in the color chart, and measured color values are obtained by measuring the color of the each color patch with printer 30 (printer 1 and printer 2 in the example of FIG. 9A). The control section 21 compares the measured color values with the reference value for each color to calculate the success rate of color reproduction for each color. For example, after a certain number of times of color measurements of the color chart (for example, four times of color measurements) performed in color calibration, the success rate should be 100% if all the color measurements resulted in that the difference of the reference value and the measured color value fell in a predetermined range, and should be 75% if one out of the four color measurements resulted in that the difference fell out of the predetermined range. Although the reference values and the measured color values in FIG. 9A are represented by RGB values, they may be represented by RGB values, which are output values of the sensors of color measuring section 35, or L*a*b* values, which are component values (coordinate values) of a device-independent color space.

Alternatively, control section 11 of server 10 (information storage processing section 11a) may calculate the success rate of color reproduction for each color, and then record the reference value, the measured color values and the success rates of color reproduction in the database for each color, in advance, as illustrated in FIG. 9B. In such a case, the control section 21 (color defining section 21b) is needed only to obtain the success rate of color reproduction for each color from the database. In this example, the control section 11 calculates the success rate of color reproduction for each color, but the control section 11 may calculate, for example, a variation of color reproduction (measured color values) in place of or in addition to the success ratio of color reproduction. The control section 21 may calculate the variation for each color by using a sum of standard deviations of component values of the L*a*b* color space (L*, a*, b* values) corresponding to the measured color value; a sum of weighted standard deviations of component values of the L*a*b* color space corresponding to the measured color value; a variance of each of the component values of the L*a*b* color space, which represents how much a sample is dispersed from the sample mean; or a difference between the maximum value and the minimum value of each of the component values of the L*a*b* color space corresponding to the measured color value.

In this example, the control section 21 calculates the success rate of color reproduction and/or the variation of color reproduction for each color on the basis of the history information of color measurement which was obtained from printer 30 controlled by printer controller 20 (in other words, printer 30 to be calibrated by printer controller 20) and stored in the database. Alternatively, the control section 11 (information storage processing section 11a) of server 10 or the control section 21 (information storage processing section 21d) of printer controller 20 may store measured color value of colors in the color chart obtained from plural printers 30 into the database. Then, the control section 21 (color defining section 21b) may refer to history information of color measurement (measured color values) given by target printer 30, which is to be calibrated, and one or more printers 30 other than the target printer 30, and calculate the success rate and/or the variation of color reproduction for each color to define the color for determining a color calibration necessity of the target printers 30. Herein, it is preferable that the one or more printers 30 other than the target printer 30 are of the same model or the same production lot as that of the target printer 30, or are the substantially same in one of maintenance time, frequency of use and operating environment, as that of the target printer 30. In concrete terms, since it can be considered that printers of the same model and printers of the same production lot use the same kinds of toner, and that measured color values change similarly with time in these printers, the control section 21 may calculate the success rate and/or the variation of color reproduction for each color on the basis of the history information of color measurement obtained from plural printers 30 which are the same in model and/or production lot to each other. Further, since it can be considered that, in printers, the success rate and/or the variation of color reproduction for each color change according to the elapsed time from last maintenance and the number of printed sheets, the control section 21 may calculate the success rate and/or the variation of color reproduction for each color on the basis of the history information of color measurement obtained also from one or more printers 30 in which the elapsed time from last maintenance and/or the number of printed sheets are close to the target printer 30. Further, since it can be considered that the success rate and/or the variation of color reproduction for each color change according to the operation environment (e.g., temperature and humidity), the control section 21 may calculate the success rate and/or the variation of color reproduction for each color on the basis of the history information of color measurement obtained also from one or more printers 30 used under the similar environment to the target printer 30.

Next, the control section 21 (color defining section 21b) determines colors used in an image region of a page, which is now processed, of the print job (S202). In concrete terms, the control section 21 (color defining section 21b) obtains a list of colors used in the page currently processed from the result of the analysis of the print job done by the control section 21 (RIP processing section 21a), and determines colors used in the image region of the page on the basis of that list.

Next, by using the success rate calculated (or obtained) for each color in S201 and the colors determined in S202, the control section 21 (color defining section 21b) selects a color the success rate of color reproduction of which is lower than the other colors from among colors used in the page currently processed (S203). In this example, the success rate of color reproduction is calculated for each of all the colors registered the database, and colors are selected one by one in order from lowest success rate of color reproduction to highest. If there is a color the success rate of color reproduction of which is extremely low in the colors registered in the database, that color can be selected at all times when the color for determining a necessity of color calibration is defined. It frequently causes color calibration of printer 30 and thus waiting time for printing increases. In such a case, the control section 21 may exclude a color the success rate of color reproduction of which is extremely low from the colors for the selection so that the control section 21 can select a color the success rate of which is lower than the other colors from the remaining colors. Further, since some user regards the reproduction of a certain color as important and such a color may be different according to a user, the control section 21 may select colors in order from lowest success rate of color reproduction to highest from among colors used in the page currently processed and chosen by a user in advance. In another case that the control section 21 selects a color for determining a color calibration necessity by using a variation of color reproduction for each color, the control section 21 may select a color of which the variation of color reproduction (measured color value) is greater than the other colors. Under a situation that the number of times of color calibration is requested to be reduced in view of a reduction of waiting time for printing, the control section 21 can select a color the success rate of color reproduction of which is higher than the other colors or the variation of color reproduction of which is smaller than the other colors.

At this time, if a page which is currently processed includes a very small-sized region or object in the color selected in S203, some kind of inline sensor may not able to measure the selected color because of the precision. In view of that, the control section 21 (color defining section 21b) determines whether the color selected in S203 can be measured (whether the region or object is greater than or equal to a preset size) on the basis of a result of analysis of print data conducted by the RIP processing section 21a (S204). If the region or object in the color selected in S203 is not the region or object which is equal to or greater than the preset size (No in S204), the control section 21 determines that the color measurement is cannot be done and the process returns to S203 to select a color the success ratio of color reproduction of which is the next lowest (or the variation of color reproduction of which is the next greatest). Then, if the color selected in S203 can be measured, the control section 21 defines the color as the color for determining a color calibration necessity (S205).

Returning now to the flowchart in FIG. 7, the control section 21 (color calibration controlling section 21c) determines a region or an object that use the color defined in the above step by referring to the result of analysis of a print job conducted by the control section 21 (RIP processing section 21a), operates the color measuring section 35 of printer 30 to measure the defined color of the region or object one by one to obtain data of the measured color values of the defined color (S102). FIG. 10 illustrates an example of a page image. The control section 21 causes the color measuring section 35 to measure colors of the region where the object in the color for determining color calibration necessity (the diamond-shaped object in black in FIG. 10) is drawn, out of objects in the image region. Since different colors can be used in each page and the color defined in the above step can be used in a different region in each page, the color measuring section 35 measures a different region in each page in such a case.

Next, the control section 21 (color calibration controlling section 21c) determines whether to calibrate printer 30 according to whether a change with time in the measured color value of the color for determining color calibration necessity fells within a predetermined range or whether the difference of the measured color value of the color for determining color calibration necessity and the color value (reference value) set in the print data fells within a predetermined range (S103). If the control section 21 has determined not to calibrate the printer 30, the printing processing is continued.

Meanwhile, if the control section 21 has determined to calibrate the printer 30, the control section 21 (color calibration controlling section 21c) operates the print processing section 34 of the printer 30 to print out a color chart to be used for color measurement, where the color chart includes an array of color patches (S104). Then, the control section 21 (color calibration controlling section 21c) causes the color measuring section 35 to measure the colors in the color chart, calibrates the printer 30 by, for example, creating a printer profile on the basis of the measured color values of the color chart, and transmits the data of the measured color values to the server 10 so as to be stored in the database (S105). After calibrating the printer 30, the control section 21 turns back one page or a predetermined number of pages of the print job (S106), and returns to S101 to reprint the page or pages.

Thereafter, the control section 21 determines whether all the pages in a print job has been printed out (S107). When the printing for all the pages has been finished, the control section 21 ends the print job.

The above-described flow uses one color for determining a color calibration necessity, and the control section 21 determines to calibrate printer 30 when the change with time in the measured color value of the color for determining a color calibration necessity exceeds the predetermined range or when the difference of the measured color value of the color for determining a color calibration necessity and the reference value exceeds the predetermined range. Alternatively, the control section 21 may use plural colors for determining a color calibration necessity and determine whether to calibrate the printer 30 on the basis of each of the plural colors. The control section 21 may determine to calibrate the printer 30 when the change with time in the measured color value of at least one of the colors for determining a calibration necessity exceeds the predetermined range or when the difference of the measured color value of at least one of the colors and the corresponding reference value exceeds the predetermined range.

As described above, in the present example, the control section 11 of server 10 or the control section 21 of printer controller 20 obtains history information of color measurement from a database prepared in advance, and calculates a success rate of color reproduction and/or a variation of color reproduction for each color. The control section 21 further selects a specific color or colors in order from lowest success rate of color reproduction to highest or in order from greatest variation of color reproduction to smallest, from among colors contained in each page. The control section 21 causes color measuring section 35 of printer 30 to measure colors of a region or object in the selected specific color or colors, and determines whether to calibrate printer 30 according to a change with time of the measured color values. Such control can realize a reduction of waist or spoiled sheets of paper, a reduction of the amount of consumption of consumables, and a reduction of waiting time for printing.

Example 2

Next, an illustrative print control apparatus, print system, non-transitory computer-readable storage medium storing a color calibration control program, and color calibration control method according to EXAMPLE 2 will be described with reference to FIGS. 11A to 14. FIGS. 11A and 11B are schematic diagrams illustrating a structure of a print control apparatus of the present example. FIGS. 12 and 13 are flowcharts illustrating operation of the print control apparatus of the present example. FIG. 14 is a diagram illustrating a color patch in a color for determining a color calibration necessity.

In the above EXAMPLE 1, the control section 21 determines whether to calibrate printer 30 by measuring colors in the region or object in the color for determining a color calibration necessity in a page image. Alternatively, if a page image is printed on a sheet together with a margin where no page image is formed, the control section 21 may arrange a color patch in the color for determining a color calibration necessity in the margin and causes the printer 30 to measure the color patch to determine whether to calibrate the printer 30 or not.

In the case that the necessity of color calibration is determined by color measurement of a color patch, the configuration of the print system is the same as that of EXAMPLE 1, but the control section 21 of the printer controller 20 further serves as margin finding section 21e, as illustrated in FIG. 11B, additionally to RIP processing section 21a, color defining section 21b, and a color calibration controlling section 21c (and information storage processing section 21d, if needed).

The margin finding section 21e analyzes data of a bitmap image rasterized by the RIP processing section 21a and finds a margin. If there is a margin in a page, the margin finding section 21e arranges in the margin a color patch in the color for determining a color calibration necessity defined by the color defining section 21b and sends RIP processing section 21a an instruction to carry out RIP again.

The RIP processing section 21a, color defining section 21b, color calibration controlling section 21c, and margin finding section 21e may be provided as hardware devices. Alternatively, the RIP processing section 21a, color defining section 21b, color calibration controlling section 21c, and margin finding section 21e (especially, color defining section 21b, color calibration controlling section 21c, and margin finding section 21e) may be provided by a color calibration control program which causes the control section 21 to function as these sections when being executed. That is, the control section 21 may be configured to serve as RIP processing section 21a, color defining section 21b, color calibration controlling section 21c and margin finding section 21e (especially, color defining section 21b, color calibration controlling section 21c, and margin finding section 21e), when the CPU executes the color calibration control program.

Hereafter, processing of the printer controller 20 of the above configuration will be described. The CPU executes processes in the steps shown in the flowcharts of FIGS. 12 and 13 by loading a color calibration control program stored in the ROM or the storage section 22 into the RAM and executing the program. It should be noted that control section 11 of server 10 (information storage processing section 11a) or control section 21 of printer controller 20 (information storage processing section 21d) creates a database on the basis of history information of color measurement obtained from printer 30, and stores the created database in storage section 12 or storage section 22 in advance to the following processing. Further, it is assumed that a page image is printed on a sheet together with a margin where there is no page image.

First, control section 21 of printer controller 20 (color defining section 21b) defines a specific color as a color for determining a color calibration necessity (S301). In this process in EXAMPLE 1, as illustrated in the flowchart of FIG. 8, the control section 21 defines the specific color (color for determining a color calibration necessity) from among colors used in a page image which is currently processed. In the present example, the control section 21 defines the color for determining a color calibration necessity by using a color patch arranged in the margin, according to the steps illustrated in FIG. 13.

In concrete terms, the control section 21 (color defining section 21b) obtains history information of color measurement from a database stored in storage section 12 in server 10 (or storage section 22 in printer controller 20), and calculates a success rate of color reproduction for each color on the basis of the obtained history information of color measurement (S401). In this process, if the control section 11 (information storage processing section 11a) in server 10 has already calculated the success rate of color reproduction for each color and recorded the calculated success rate of color reproduction for each color into the database, the control section 21 (color defining section 21b) is needed only to obtain the success rate of color reproduction for each color from the database. Further, the control section 21 may calculate a variation of color reproduction for each color in place of or additionally to the success rate of color reproduction for each color. With respect to the history information of color measurement, the control section 21 may obtain the history information of color measurement given just from printer 30 controlled by printer controller 20 (in other words, a target printer to be calibrated). Additionally to the history information of color measurement given by the target printer, the control section 21 may obtain history information of color measurement given from one or plural printers other than the target printer. For example, the control section 21 may obtain history information of color measurement given from plural printers which are of the same model or the same production lot as that of the target printer 30, may obtain history information of color measurement given from one or plural printers which are substantially the same in elapsed time from the last maintenance or the number of sheets which have been printed as that of the target printer 30, or may obtain history information of color measurement given from one or plural printers which are substantially the same in operating environment as that of the target printer 30.

Next, on the basis of the success rate calculated (or obtained) for each color in S401, the control section 21 (color defining section 21b) defines a specific color as a color for determining a color calibration necessity (S402). For example, as the color for determining a color calibration necessity, the control section 21 (color defining section 21b) may select a color the success rate of color reproduction of which is lower than the other colors; a color the success rate of color reproduction of which is lower than the other colors, selected from colors excluding the color the success rate of color reproduction of which is extremely low; a color the success rate of color reproduction of which is lower than the other colors, selected from colors chosen by a user in advance; or a color of the variation of color reproduction of which is greater than the other colors. Alternatively, a color the success rate of color reproduction of which is greater than the other colors or the variation of color reproduction of which is smaller than the other colors may be defined as the color for determining a color calibration necessity.

Returning now to the flowchart in FIG. 13, the control section 21 (margin finding section 21e) arranges in the margin a color patch in the color for determining a color calibration necessity defined in S401 and sends the RIP processing section 21a an instruction to carry out RIP again. Then, the control section 21 (RIP processing section 21a) carries out RIP again, transmits data of a bitmap image obtained after the second RIP to print processing section 34 of printer 30, and operates the printer 30 to print a color patch in the color for determining a color calibration necessity in the margin around the page image based on a print job (S302). FIG. 14 illustrates an example of printout in which the color patch in the color for determining a color calibration necessity is printed in the margin. It should be noted that the size, the number, and the position of the color patch can be modified as appropriate according to the size of the margin, color measurement precision of the inline sensor, user's setting, or the like.

Next, the control section 21 (color calibration controlling section 21c) causes the color measuring section 35 of the printer 30 to measure the color of the color patch printed in S302 one by one and obtains data of measured color values (S303).

Next, the control section 21 (color calibration controlling section 21c) determines whether to calibrate printer 30 according to whether a change with time in the measured color value of the color for determining a color calibration necessity fells within a predetermined range or whether the difference of the measured color value of the color for determining a color calibration necessity and the target color value (reference value) set to the color for determining a color calibration necessity fells within a predetermined range (S304). If the control section 21 has determined not to calibrate the printer 30, the printing processing is continued.

Meanwhile, if the control section 21 has determined to calibrate the printer 30, the control section 21 (color calibration controlling section 21c) causes the print processing section 34 of the printer 30 to print out a color chart to be used for color measurement, where the color chart includes an array of color patches (S305). Then, the control section 21 (color calibration controlling section 21c) causes the color measuring section 35 to measure the colors in the color chart, calibrates printer 30 by, for example, creating a printer profile on the basis of the measured color values of the color chart, and transmits data of the measured color values to the server 10 so as to be stored in the database (S306). After calibrating the printer 30, the control section 21 turns back one page or a predetermined number of pages of the print job (S307), and returns to S301 to reprint the page or pages.

Thereafter, the control section 21 determines whether all the pages in a print job has been printed out (S308). When the printing for all the pages has been finished, the control section 21 ends the print job.

As described above, in the present example, the control section 11 of server 10 or the control section 21 of printer controller 20 obtains history information of color measurement from a database prepared in advance, and calculates a success rate of color reproduction and/or a variation of color reproduction for each color. The control section 21 further selects a specific color or colors in order from lowest success rate of color reproduction to highest or in order from greatest variation of color reproduction to smallest, and causes printer 30 to print a color patch in the selected specific color in margin in a page. The control section 21 causes color measuring section 35 of printer 30 to measure the color of the color patch, and determines whether to calibrate printer 30 according to a change with time in the measured color values of the color patch. Such control can realize a reduction of waist or spoiled sheets of paper, a reduction of the amount of consumption of consumables, and a reduction of waiting time for printing.

It should be noted that the present invention is not limited to the above embodiments and examples and the configuration and control thereof may be modified as appropriate unless not deviating from the spirit of the present invention.

For example, the database stores history information of color measurement obtained by measuring a color chart to be used for color measurement, in the above-described examples. The database may further store history information of color measurement of a region or patch in the color for determining a color calibration necessity, which is obtained while printer 30 is processing a print job. Further, in the above examples, as information to be used for defining the color for determining a color calibration necessity, the success rate of color reproduction or the variation of color reproduction is calculated for each color on the basis of history information of color measurement. Alternatively, another information, for example, information by which the control section 21 can determine whether the color concerned can be reproduced with high color reproducibility or low color reproducibility, may be calculated for defining the color for determining a color calibration necessity.

The invention claimed is:

1. A print control apparatus for controlling at least one printing device, the print control apparatus comprising a hardware processor configured to:
   store measured color values into a database which stores history information of color measurement, the measured color values being obtained by measuring colors in a color chart by using a printing device;
   select a specific color by referring to the database, the specific color being a color to be used for determining whether to calibrate the printing device, the specific color being exclusively a single color out of the plurality of the colors in the color chart and being selected by performing calculations using the history information of the color chart; and
   while the printing device is processing a print job,
      cause the printing device to measure the specific color to obtain a measured color value of the specific color,
      determine whether to calibrate the printing device on a basis of a change with time in the measured color value of the specific color, and
      in response to determining to calibrate the printing device, calibrate the printing device.

2. The print control apparatus of claim 1,
wherein the hardware processor is configured to:
   calculate, on a basis of the history information stored in the database, at least one of a rate at which a predetermined color measurement occurred for the each color in the color chart and a variation of measured color value of the each color in the color chart, the predetermined color measurement being a color measurement such that a difference of the measured color value of the each color and a corresponding reference value fell in a predetermined range, and
   select the specific color on a basis of the at least one of the rate and the variation calculated for the each color.

3. The print control apparatus of claim 2,
wherein the hardware processor is configured to select a color with at least one of the rate being lower than those of the other colors in the color chart and the variation being greater than those of the other colors in the color chart, as the specific color.

4. The print control apparatus of claim 2,
wherein the hardware processor is configured to calculate the variation of the measured color value of the each color by using one of
   a sum of standard deviations of components of a certain color space corresponding to the measured color value of the each color,
   a variance of each of the components of the certain color space corresponding to the measured color value of the each color, and
   a difference of a maximum value and a minimum value of each of the components of the certain color space corresponding to the measured color value of the each color.

5. The print control apparatus of claim 2,
wherein the hardware processor is configured to select the specific color on the basis of the at least one of the rate and the variation, selected from colors contained in each page image in the print job.

6. The print control apparatus of claim 2,
wherein the hardware processor is configured to select the specific color on the basis of the at least one of the rate and the variation, selected from colors which have been chosen by a user in advance.

7. The print control apparatus of claim 1,
wherein the hardware processor is configured to:
   determine a region or an object in the specific color within each page image in the print job, and
   cause the printing device to measure a color of the region or the object to obtain the measured color value of the specific color.

8. The print control apparatus of claim 1, wherein the hardware processor is configured to:
   find a margin in each page of the print job and arrange a color patch of the specific color in the margin, where the margin is a region where a page image is not formed in each page of the print job, and
   cause the printing device to measure a color of the color patch to obtain the measured color value of the specific color.

9. The print control apparatus of claim 1,
wherein hardware processor is configured to select two or more of the specific colors, and
determine whether to calibrate the printing device on a basis of a change with time in the measured color value of each of the specific colors.

10. The print control apparatus of claim 1, wherein the hardware processor is configured to:
   store the measured color values of the colors in the color chart into the database, the measured color values being obtained by measuring the colors in the color chart by using two or more printing devices, and
   select the specific color by referring to the measured color values of the colors given by a printing device to be calibrated and one or more of the printing devices other than the printing device to be calibrated.

11. The print control apparatus of claim 10,
wherein the one or more of the printing devices are of a same model or a same production lot as that of the printing device to be calibrated, or
the one or more of the printing devices are substantially same in one of maintenance time, frequency of use and operating environment, as that of the printing device to be calibrated.

12. A non-transitory computer-readable storage medium storing a color calibration control program to be executed in a print control apparatus which controls at least one printing device, the color calibration control program, when being executed by a processor of the print control apparatus, causing the print control apparatus to perform processing comprising:
   storing measured color values into a database which stores history information of color measurement, the measured color values being obtained by measuring colors in a color chart by using a printing device;
   selecting a specific color by referring to the database, the specific color being a color to be used for determining whether to calibrate the printing device, the specific color being exclusively a single color out of the plurality of the colors in the color chart and being selected by performing calculations using the history information of the color chart; and
   determining whether to calibrate the printing device while the printing device is processing a print job, which includes
      causing the printing device to measure the specific color to obtain a measured color value of the specific color, and
      determining whether to calibrate the printing device on a basis of a change with time in the measured color value of the specific color.

13. The non-transitory computer-readable storage medium of claim 12,
wherein the selecting the specific color includes
   calculating, on a basis of the history information stored in the database, at least one of a rate at which a predetermined color measurement occurred for the each color in the color chart and a variation of measured color value of the each color in the color chart, the predetermined color measurement being a color measurement such that a difference of the measured color value of the each color and a corresponding reference value fell in a predetermined range, and
   selecting the specific color on a basis of the at least one of the rate and the variation calculated for the each color.

14. The non-transitory computer-readable storage medium of claim 13,
wherein the selecting the specific color includes selecting a color with at least one of the rate being lower than those of the other colors in the color chart and the variation being greater than those of the other colors in the color chart, as the specific color.

15. The non-transitory computer-readable storage medium of claim 13,
wherein the selecting the specific color includes
   calculating the variation of the measured color value of the each color by using one of:
      a sum of standard deviations of components of a certain color space corresponding to the measured color value of the each color,
      a variance of each of the components of the certain color space corresponding to the measured color value of the each color, and
      a difference of a maximum value and a minimum value of each of the components of the certain color space corresponding to the measured color value of the each color.

16. The non-transitory computer-readable storage medium of claim 13, wherein the selecting the specific color includes selecting the specific color on the basis of the at least one of the rate and the variation, selected from colors contained in each page image in the print job.

17. The non-transitory computer-readable storage medium of claim 13,
wherein the selecting the specific color includes selecting the specific color on the basis of the at least one of the rate and the variation, selected from colors which have been chosen by a user in advance.

18. The non-transitory computer-readable storage medium of claim 12,
wherein the determining whether to calibrate the printing device includes
determining a region or an object in the specific color within each page image in the print job, and
causing the printing device to measure a color of the region or the object to obtain the measured color value of the specific color.

19. The non-transitory computer-readable storage medium of claim 12,
wherein the processing further comprises finding a margin in each page of the print job and arranging a color patch in the specific color in the margin, where the margin is a region where a page image is not formed in each page of the print job, and
wherein the determining whether to calibrate the printing device includes causing the printing device to measure a color of the color patch to obtain the measured color value of the specific color.

20. The non-transitory computer-readable storage medium of claim 12,
wherein the selecting the specific color includes selecting two or more of the specific colors, and
the determining whether to calibrate the printing device includes determining whether to calibrate the printing device on a basis of a change with time in the measured color value of each of the specific colors.

21. The non-transitory computer-readable storage medium of claim 12,
wherein the storing the measured color values includes storing the measured color values of the colors in the color chart into the database, the measured color values being obtained by measuring the colors in the color chart by using two or more printing devices, and
the selecting the specific color includes selecting the specific color by referring to the measured color values of the colors given by a printing device to be calibrated and one or more of the printing devices other than the printing device to be calibrated.

22. The non-transitory computer-readable storage medium of claim 21,
wherein the one or more of the printing devices are of a same model or a same production lot as that of the printing device to be calibrated, or
the one or more of the printing devices are substantially same in one of maintenance time, frequency of use and operating environment, as that of the printing device to be calibrated.

23. The print control apparatus according to claim 1, wherein the specific color is a single color selected from a plurality of colors, the specific color being selected by the hardware processor based on the history information stored in the database.

24. The print control apparatus according to claim 1, wherein the specific color is selected by the hardware processor based on analysis of the history information stored in the database.

25. The print control apparatus according to claim 1, wherein the hardware processor is configured to determine whether to calibrate the printing device on the basis of the change with time in the measured color value of only the specific color.

26. The print control apparatus according to claim 1, wherein the hardware processor is configured to select the specific color for each page of the print job.

27. The non-transitory computer readable storage medium according to claim 12, wherein the selecting of the specific color by referring to the database is performed for each page of the print job.

* * * * *